US007111135B2

(12) United States Patent
Justo et al.

(10) Patent No.: US 7,111,135 B2
(45) Date of Patent: Sep. 19, 2006

(54) RANDOM ACCESS TIME TO DATA STORED ON LTO TAPE BY INCORPORATING STACKED CARTRIDGE MEMORY (CM) MODULES

(75) Inventors: Roger Javier Justo, Tucson, AZ (US); Arturo Avila Mojica, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 10/461,627

(22) Filed: Jun. 13, 2003

(65) Prior Publication Data

US 2004/0255091 A1  Dec. 16, 2004

(51) Int. Cl.
*G06F 12/16* (2006.01)

(52) U.S. Cl. ............... 711/162; 711/161; 360/72.1; 360/132; 360/134

(58) Field of Classification Search ......... 711/111, 711/115, 162; 360/72.1, 72.2, 132, 134
See application file for complete search history.

(56) References Cited

U.S. PATENT DOCUMENTS

| 6,172,833 | B1 | 1/2001 | Fry et al. |
| 6,188,536 | B1 | 2/2001 | Chliwnyi |
| 6,317,814 | B1 | 11/2001 | Blendermann |
| 6,674,599 | B1 * | 1/2004 | Rae et al. ........... 360/72.1 |
| 2001/0043436 | A1 * | 11/2001 | Onmori et al. ...... 360/132 |
| 2004/0153250 | A1 * | 8/2004 | Goodman et al. .... 700/214 |
| 2004/0165304 | A1 * | 8/2004 | Greco et al. ........ 360/75 |

OTHER PUBLICATIONS

Martin L. Shooman, Reliability of Computer Systems and Networks, John Wiley & Sons, Inc, 2002.*

* cited by examiner

*Primary Examiner*—Woo H. Choi
(74) *Attorney, Agent, or Firm*—Scully, Scott, Murphy & Presser; Robert Sullivan, Esq.

(57) ABSTRACT

A tape cartridge having dual cartridge memory modules to provide memory redundancy, and a method and apparatus for providing redundancy of cartridge memory information within a tape cartridge. The tape cartridge comprises at least first and second cartridge memory modules, each of which stores an identical set of critical information. Each of the first and second cartridge memory modules includes enough critical information to recover from a failure of either of the cartridge memory modules. The method comprises the steps of providing at least two cartridge memory modules in the tape cartridge, and storing an identical set of critical information in each of the two cartridge memory modules. Each of the two cartridge memory modules includes enough critical information to recover from a failure of either cartridge memory module. In a preferred embodiment, the CM modules are stacked one on top of another and increase the amount of space available for tape directory storage.

24 Claims, 5 Drawing Sheets

RANDOM ACCESS TIME TO DATA STORED ON LTO TAPE BY INCORPORATING STACKED CARTRIDGE MEMORY (CM) MODULES

BACKGROUND OF THE INVENTION

1. Field of the Invention

This invention generally relates to cartridge memory modules. More specifically, the invention relates to a tape cartridge having dual cartridge memory modules to provide memory redundancy, and to a method and apparatus to provide redundancy of cartridge memory information by the use of dual cartridge memory modules.

2. Background Art

Accessing data stored on linear tape is a function of data density and tape length. The longer the tape length, the longer it may take to access data on it. Current Linear Tape Open (LTO) products make use of a cartridge memory (CM) module to store tape directory and end of data (EOD) information.

In use, the CM modules are physically installed within tape cartridges, and the CM modules are addressed and modified by use of a contactless interface. Information read and updated in the CM module is accomplished from a transmitter incorporated into the tape drive. A list of standard or common CM memory contents, for example, is given in the LTO Tape Format Standard—ECMA 319 Data Interchange on 12, 7 mm 384 Track Magnetic Tape Cartridges—Ultrium 1 Format—Annex D LTO Cartridge Memory.

One type of information stored on CM modules is tape directory information, which is comprised of data that relate the physical position of key landmarks on the tape to the logical record found at that landmark. On LTO media, the physical data are conventionally addressed as longitudinal position (LPOS) (length wise access) by wrap position (traverse wise access). According to industry standards for generation 1 LTO products, there are 0.0072 meters per LPOS unit, each wrap is 580 meters (or 80555 LPOS unit in length), and there are forty-eight wraps across the width of the tape.

The cartridge memory technology used in the first generation LTO products (4 KB memory limitation) has imposed the limit on the number of tape directory entries to only 96 entries (two entries per wrap×48 wraps). Thus, the tape directory landmark information is limited to the mid-point and end-point of each wrap, resulting in 290 meters (580/2) meters between landmark information points. These landmark points, it may be noted, are referred to as wrap sections in the ECMA 319 Standard.

Table I below gives an example of tape directory information, and Table II below gives an example of information available at a wrap section.

TABLE I

Tape Directory

| Field | R/O | Offset | Bytes | Description |
|---|---|---|---|---|
| Page Id | RI | 0 | 2 | This field shall be set to (0103) indicating the Tape Directory Page. |
| Page Length | RI | 2 | 2 | This field shall be set to (0610) which indicates the length of this Page. |

TABLE I-continued

Tape Directory

| Field | R/O | Offset | Bytes | Description |
|---|---|---|---|---|
| FID Tape Write Pass | O | 4 | 4 | The content of this field is not defined by this RCMA Standard and shall be ignored in interchange. |
| Reserved | RU | 8 | 8 | These bytes shall be set to (00). |
| Wrap Section 0 | RI | 16 | 16 | As defined below. |
| Wrap Section 1 | RI | 32 | 16 | |
| . | . | . | . | |
| . | . | . | . | |
| . | . | . | . | |
| Wrap Section 94 | RI | 1520 | 16 | |
| Wrap Section 95 | RI | 1536 | 16 | |

TABLE II

Wrap Section

| Field | | Bytes | Description |
|---|---|---|---|
| Per Wrap Section | Data Set Id | 4 | This field shall specify the Data Set Identity of the last Data Set written in this wrap section. If this wrap section does not contain valid Data Sets, then this field shall be set to (FFFFFFFF). |
| | Record Count | 4 | If this Wrap Section is valid, this field shall contain the number of Records that are started in the current Wrap Section. If the Data Set ID of this Wrap Section is (FFFFFFFF) and hence this Wrap Section is invalid, the Record Count field is not defined for interchange |
| | File Mark Count | 4 | If this Wrap Section is valid, this field shall contain the number of File Marks that are within the current Wrap Section. If the Data Set ID of this Wrap Section is (FFFFFFFF) and hence this Wrap Section is invalid, the File Mark Count field is not defined for interchange. |
| | CRC | 4 | This field shall specify the CRC generated over bytes 0 to 11 of this section of this wrap section. |

The logical record found at each landmark is also recorded in each tape directory entry. Due to variances in host transfer record sizes and in compression ratios, the location of records is not linear on the tape. Because of this, locating to a random logical block requires a specialized algorithm to interpolate the physical position of that record from the two reference points (the mid-point landmark and the end-point landmark) of each wrap. Given the coarse nature of the tape directory (one every half wrap, or wrap section), the algorithm must approximate such that overshoots are avoided. Such approximations limit the effectiveness and speed of the search algorithm. In addition, the algorithm must take extreme caution where repositioning records (establishing a new sequence) to prevent encountering and referencing records that have become obsolete due to on-the-fly rewriting, which is permitted by industry standards.

End of data (EOD) information provides the physical position (LPOS and wrap) of the End-of-Data marker. Tables III and IV below give examples of end-of-data information.

TABLE III

EOD Information

| Field | R/O | Offset | Bytes | Description |
|---|---|---|---|---|
| Page Id | RI | 0 | 2 | This field shall be set to (0104) indicating the EOD Information Page. |
| Page Length | RI | 2 | 2 | This field shall be set to (0040) which indicates the length of this page. |
| Tape Write Pass for last written EOD | RI | 4 | 4 | This field shall indicate the current value of the Tape Write Pass. |
| Thread Count | RI | 8 | 4 | This field shall specify the value of the Thread Count field in the Cartridge Status Information when the EOD Data Set was written. |
| Record Count at EOD | RI | 12 | 6 | The field shall specify the number of Records that are contained on the tape between BOT and EOD. |
| File Mark Count at EOD | RI | 18 | 6 | This field shall specify the number of File Marks that are contained on the tape between the BOT and EOD. |
| EOD Data Set Number | RI | 24 | 4 | This field shall specify the Data Set number of the EOD Data Set. |
| Wrap Section Number of EOD | RI | 28 | 4 | This field shall specify the identification of the wrap section in which EOD is contained. |

TABLE IV

| Field | R/O | Offset | Bytes | Description |
|---|---|---|---|---|
| Validity of EOD | RI | 32 | 2 | This field shall indicate the current status of the information held about EOD. This shall be set to (0000): The position of EOD is unknown. (0001): The information in this area identifies the location of EOD. (00002): A Backup was in progress, and so there is no EOD Data Set on tape. The EOD Information Page shall specify details of a Data Set that is known to be at or before the current location on tape. (0003): A Backup has been performed, but the drive failed to write the EOD Data Set to tape correctly. The EOD Information Page shall contain details of the Data Set that caused the Backup to fail. |
| First CQ Set Number | RI | 34 | 2 | This field shall specify the Absolute CQ Set Number (CAN) of the first CQ Set in the EOD Data Set. |
| Physical Position of EOD | RI | 36 | 4 | This field shall specify the LPOS value information at which EOD was written. This shall be a value for a LPOS Mark that lies within, or before, the DSS preceding the EOD Data Set. |
| Reserved | RI | 40 | 20 | These bytes shall be set to all (00). |
| CRC | RI | 60 | 4 | This field shall specify the CRC generated over bytes 0 to 59 of this Page. |

If a failure of a cartridge memory module occurs, accessing tape data is limited to linear (physical) searches, which may take a substantial length of time. For instance, on the first generation product, the time to locate to the last record on tape may take almost two hours (48 wraps×580 meters per wrap×4 meters per second (read velocity)=6960 seconds, which is nearly two hours). EOD information would also be limited to a linear search.

SUMMARY OF THE INVENTION

An object of this invention is to provide redundancy of cartridge memory information in a tape cartridge.

Another object of this invention is to provide a cartridge memory module with higher resolution tape directory information.

A further object of this invention is to incorporate multiple cartridge memory modules in a tape cartridge.

Another object of the present invention is to stack cartridge memory modules, one on top of the other, in a tape cartridge to increase the amount of space available for tape directory storage.

A further object of the invention is to provide additional cartridge module memory space that can be used exclusively for tape directory and end-of-data information.

These and other objectives are attained with a tape cartridge having dual cartridge memory modules to provide memory redundancy, and to a method and apparatus for providing redundancy of cartridge memory information within a tape cartridge. The tape cartridge comprises at least first and second cartridge memory modules, each of which stores an identical set of critical information. Each of the first and second cartridge memory modules includes enough critical information to recover from a failure of either of the cartridge memory modules. The method comprises the steps of providing at least two cartridge memory modules in the tape cartridge, and storing an identical set of critical information in each of the two cartridge memory modules. Each of the two cartridge memory modules includes enough critical information to recover from a failure of either cartridge memory module.

In a preferred embodiment, multiple cartridge memory modules are incorporated in a tape cartridge. Stacked, one on top of the other, the CM modules increase the amount of space available for tape directory storage. The additional CM memory space can be set aside exclusively for tape directory and EOD information, effectively more than doubling the tape directory information. This may be used to provide redundancy of CM information and higher resolution of the tape directory.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
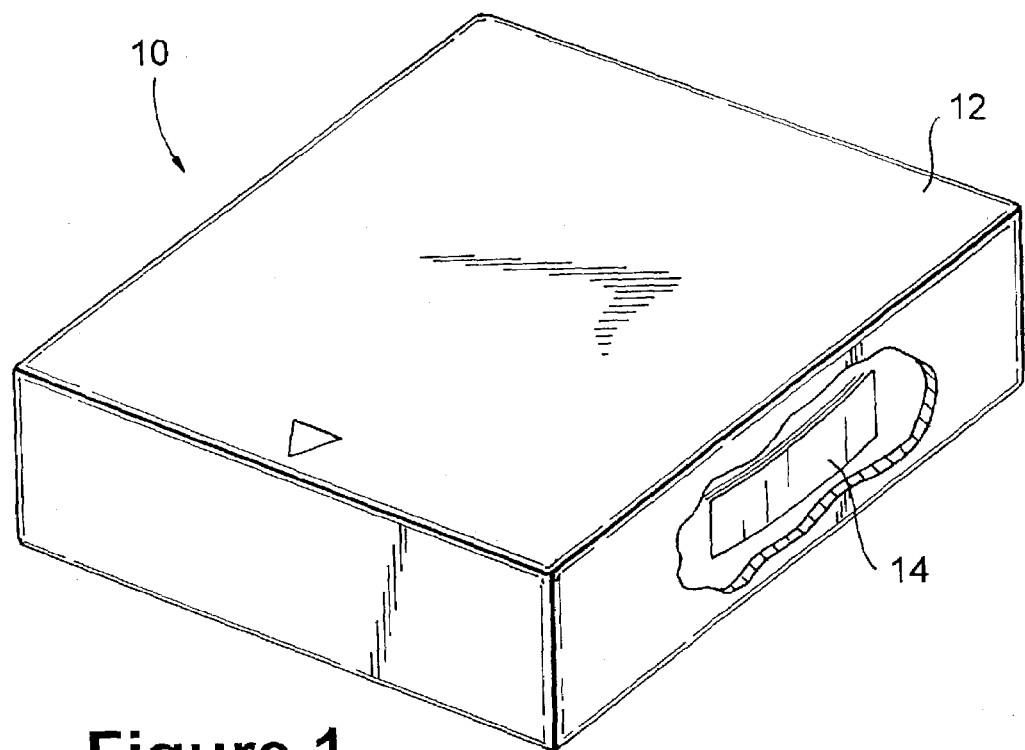
FIGS. 1 and 2 show a tape cartridge including plural cartridge memory modules.
Figure 2:
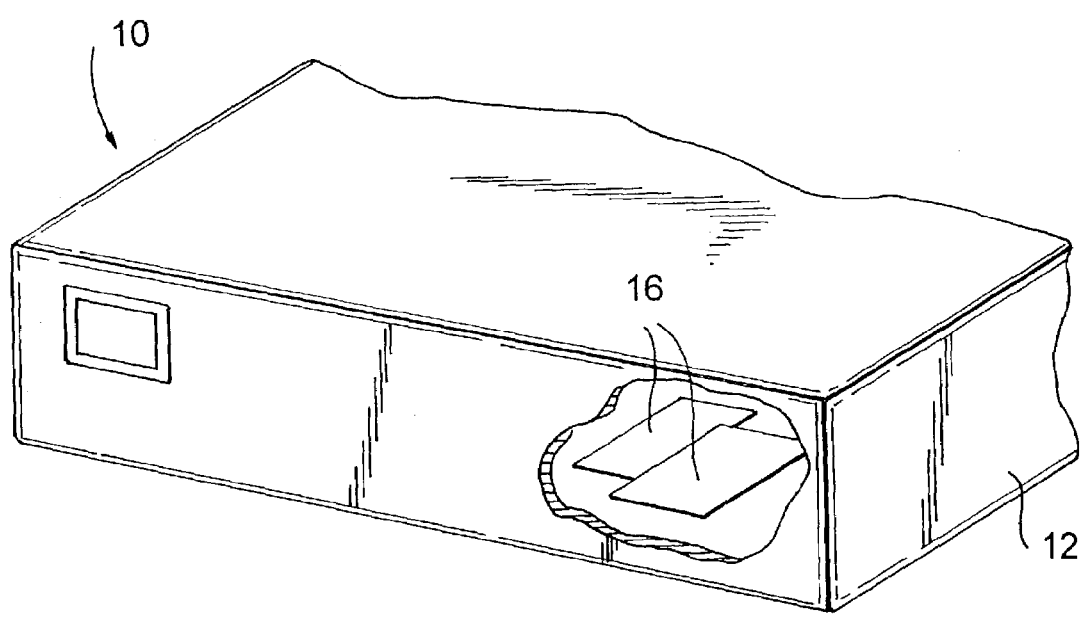

FIGS. 1 and 2 illustrate a tape cartridge 10. In a conventional manner, the cartridge 10 includes a housing 12 and a recording tape 14 disposed in the housing for recording information or data; and, as is standard, the tape in cartridge 10 is preferably comprised of forty-eight wraps. Also, preferably, the tape cartridge 10 includes at least two cartridge memory module 16 that provides various functions.

As discussed above, accessing data stored on the tape of cartridge 10 is a function of data density and tape length. Tape Directory information is stored in the cartridge memory module 16 and possibly on a portion of the recording tape, and this Directory information is comprised of data that relates the physical position of key landmarks on the tape to the logical record found at that landmark. Also, as is standard, the tape directory information is limited to identifying the mid-point and end-point of each wrap.

In use, a tape drive is used to record and retrieve customer data onto/from the tape recording medium 14. This is typically done by linearly and transversely positioning to physical position on the recording medium and accessing or updating logical data by means of a tape head.

A tape drive is also used to read and update cartridge memory module information regarding the physical position of logical data on the tape recording medium, and commonly this may be done by a contactless transmitter incorporated into the tape drive. More specifically, when the tape drive wants to access a particular record on the tape 14 (for reading or updating purposes), the drive will access the Tape Directory from the cartridge memory to determine the physical position of where to look for that record. This procedure generally works very well. However, in the prior art, where a tape cartridge includes only one memory module 16, if a failure of that one cartridge memory module occurs, accessing data is limited to linear searches from the physical beginning of the tape, and as a result, it may take almost two hours to locate the last record on the tape.

In order to avoid this, and with particular reference to FIG. 2, the present invention incorporates plural cartridge memory modules 16 internal to tape cartridge 10. Preferably, stacked one on top of the other, the cartridge memory modules 16 increase the amount of space available for Tape Directory storage. The additional cartridge memory space can be used exclusively for Tape Directory and end-of-data (EOD) information. This effectively more than doubles the space available for Tape Directory Information, and this added space may be used to provide redundancy of cartridge memory information and a higher resolution of the Tape Directory information. For example, critical Tape Directory information can be stored in both cartridge memory modules 16 so that, in case of a failure of one of the cartridge memory modules, that critical information can still be read from the other cartridge memory module. The end-of-data information, and other sensitive information, can be duplicated in both cartridge memory modules. This resolves the problem of a single point of failure.

Figure 3:
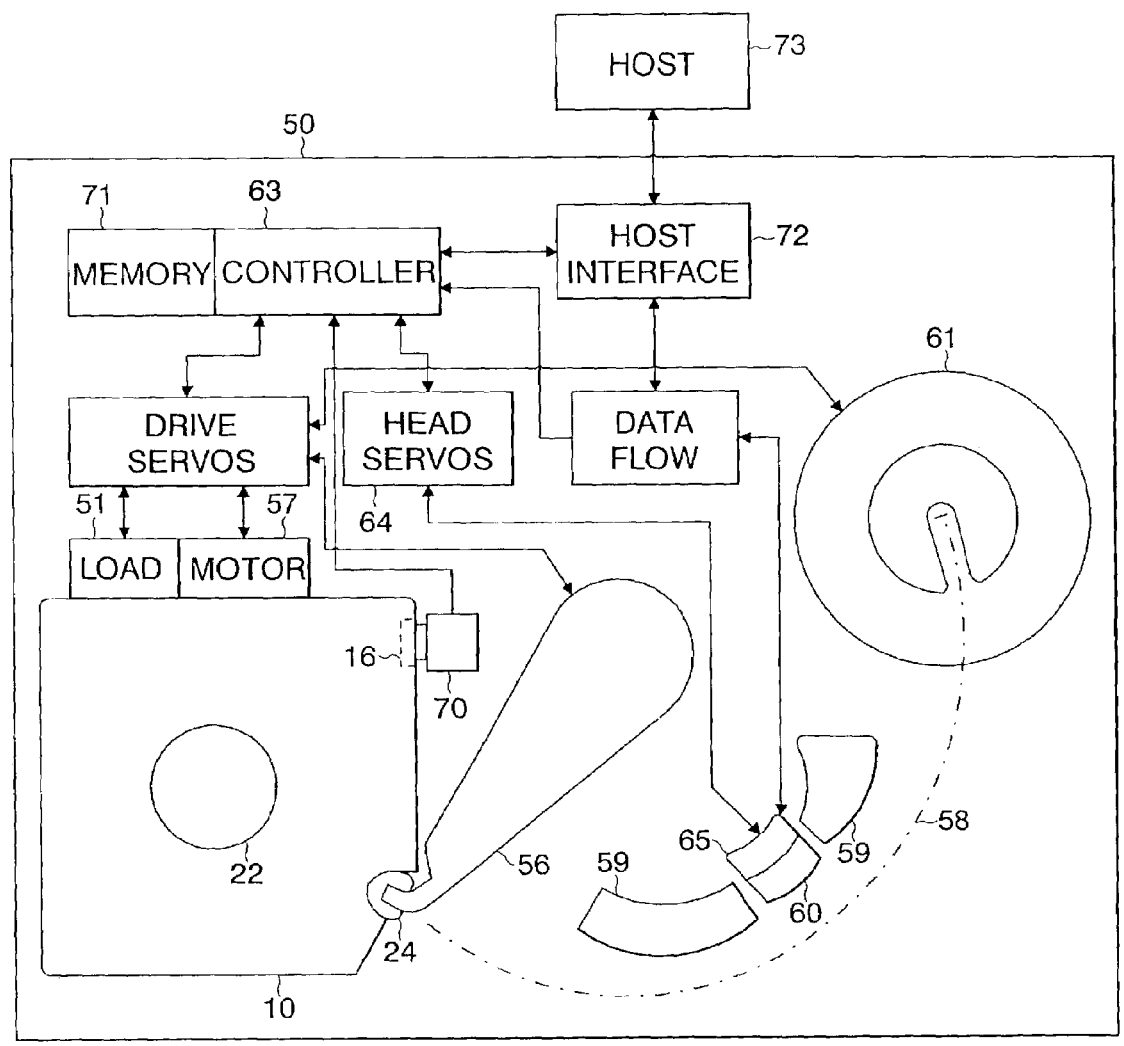
FIGS. 3 and 4 are diagrammatic representations and block diagrams of a tape drive with which the present invention may be used.
Figure 4:
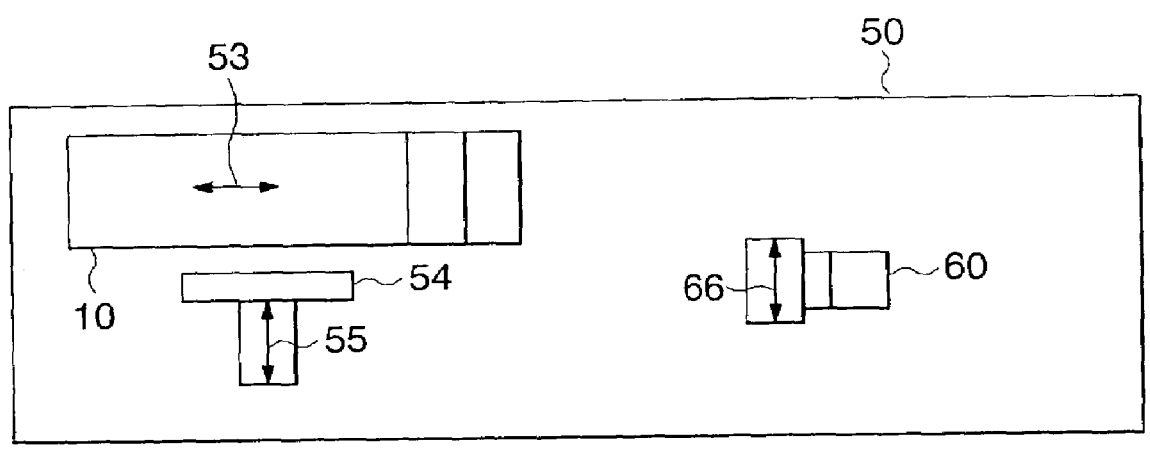

FIGS. 3 and 4 illustrate a tape drive 50 with which cartridge 10 may be used. Tape drive 50 may be located in a data storage library or may be a separate drive. Conventional elements of the tape drive include a loader 51, which is a mechanism, operated by drive servos 52, which moves a cartridge 10 into and out of the tape drive 50 in the direction of arrows 53 and either moves the cartridge vertically or moves a clutch 54 vertically in the direction of arrows 55. The vertical movement of the cartridge or the vertical movement of the clutch brings the clutch into engagement with the hub 22 of the cartridge 10. A tape threader 56 engages the tape cartridge leader block 24, and, while the drive servos 52 cause a motor 57 to rotate the clutch 54 to release and unwind the tape media, drive servos operate the tape threader 56 to move the tape media along path 58 past and into engagement with "D" bearings 59 and tape head 60, and into engagement with a take-up reel 61. After the threading operation is complete, a drive controller 63 and head servos 64 operate a head servo-mechanism 65 to move the tape head 61 vertically in the directions of arrows 66 while the drive controller and drive servos 52 operate motor 57 and take-up reel 61 to move the tape media in the longitudinal direction. The vertical movement of head 60 brings the servo head, and therefore the data heads, into alignment.

In the embodiment of tape drive 50 shown in FIGS. 3 and 4, memory interface 70 is located in the tape drive 50 so that the loader 51 first positions the memory device 16 at the memory interface. During any subsequent vertical motion of the cartridge 10, the memory device 16 will stay adjacent with the memory interface 70. In use, memory interface 70 transfers the tape directory and EOD information from the memory device 16 to the controller 63. The controller 63 comprises a data processor and includes a memory 71. The controller processor may have the capability of processing the tape directory and EOD information. The controller uses the tape directory and EOD information to access data which is to be recorded or sent to the host via the host interface 72.

Figure 5:
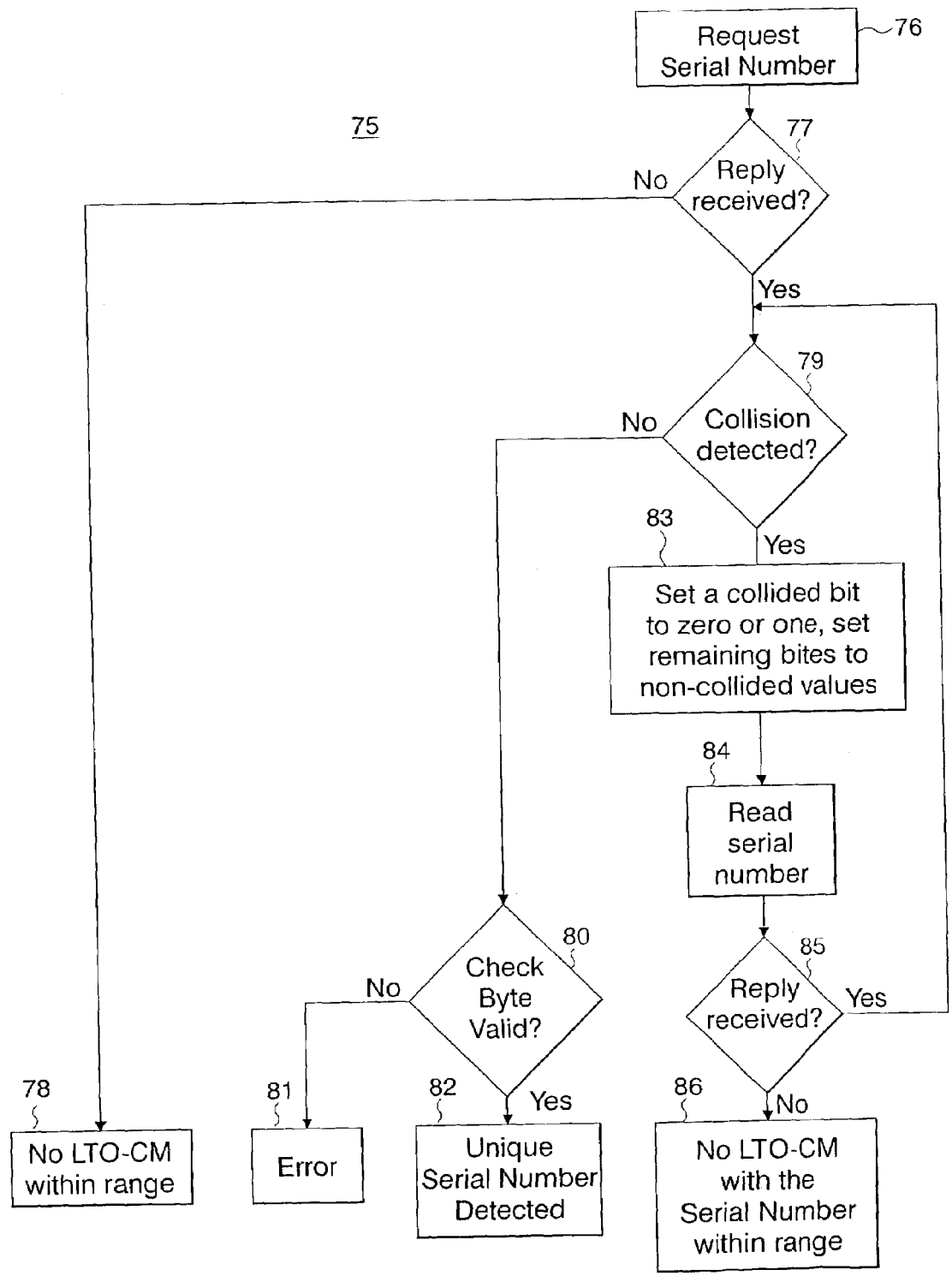
FIG. 5 is a flow chart illustrating a procedure that may be used to determine if plural cartridge memory modules are present in a tape cartridge.

Because two cartridge memory modules 16 may be within accessing range of the tape drive at the same time, preferably, the CM manufacture has provided a procedure to determine if this is the case, and if so, to identify and to communicate with each of the individual modules 16. Suitable procedures for doing this are known in the art, and for example, one procedure that may be used is illustrated at 75 in FIG. 5.

Each cartridge module is provided by the manufacture with a unique serial number or identifier; and at step 76, the tape drive, or, more specifically, a processor controlled transmit/receiver on the tape drive, sends a request for a cartridges serial number. If no reply is received at step 77, then no LTO-cartridge module is within range, as indicated by step 78, and the tape drive exits routine 75. If, however, a reply is received, then the routine proceeds to step 79, where it is determined whether more than one cartridge memory module is within range, a situation referred to as a collision. Any suitable sub-routine may be used for this purpose; and, for example, this may be done by determining whether the data received by the tape drive, in response to the request for the serial number, contains invalid bits.

If all of the individual bits are valid, which indicates that no collision was detected, then the routine goes to step 80, where the serial number, which typically is a byte, is checked to determine if it is valid. If it is not valid, an error condition has occurred, as indicated by step 81. In contrast, if the serial number is valid, then the routine concludes that a single, valid cartridge memory module is present, as indicated by step 82.

If at step 79, one or more of the received individual bits is not valid, then the routine 75 concludes that more than one cartridge memory module is present and moves to step 83. These invalid bits are referred to as collided bits; and at step 83, the routine sets each of the collided bits either to zero or one, thereby obtaining a possible serial number. At step 84, the tape drive then transmits that serial number, and then waits for a reply, as represented by step 85. If the transmitted serial number is the actual serial number of one of the cartridge memory modules that is present, that module will send out a confirmation signal. In contrast, if none of the cartridge memory modules present has the transmitted serial number, the tape drive does not receive any reply, as represented by step 86.

Steps 79, 83, 84 and 85 can be repeated until the routine 75 determines the serial numbers of all of the cartridge memory modules that are present within range. Once this is done, the tape drive can then address each of these cartridge memory modules by means of that modules serial number.

Figure 6:
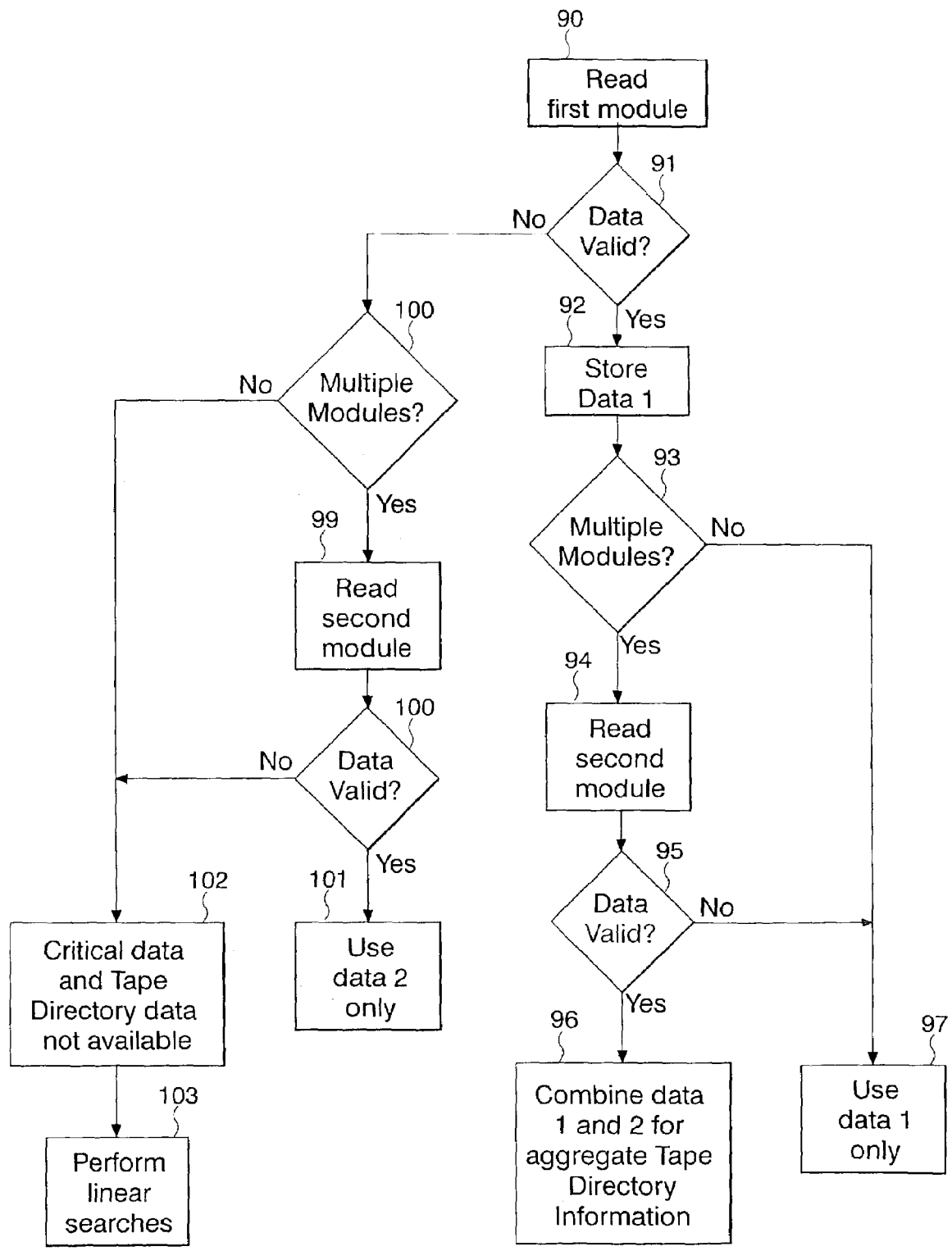
FIG. 6 is a flow chart showing a procedure for reading a pair of cartridge memory modules.

Once the tape drive determines how many cartridge memory modules are within accessing range, the tape drive reads data from the module or modules, and FIG. 6 shows a procedure for doing this. At step 90 of this procedure, the tape drive reads data from a first of the modules, and at step 91 the tape drive determines whether the read data are valid by means of CRC or other commonly used method. If this data are valid, the data are stored at step 92; and then at step 93, the tape drive determines if multiple modules are present. If multiple modules are present, then, at step 94, a second module is read, and at step 95 the tape drive determines whether this read data are valid. If this data are valid, then, at step 96, the data read from the first and second modules are combined for an aggregate tape directory information. If, however, at step 93, a further module is not present, or at step 95 the data read from the second module are not valid, then the tape drive uses only the data read from the first module, as represented at step 97.

If at step 91, the data read from the first module are not valid, the procedure of FIG. 6 proceeds the step 98, where the tape drive determines whether a second module is present. If a second module is present, that module is read at step 99; and if this data are valid, as tested at step 100, then the tape drive uses only the data read from this second module, as represented at step 101. If at step 98, a further module is not present, or at step 100, the data read from the second module are not valid, then the procedure moves to step 102. At this step, the tape drive concludes that critical data and tape directory information are not available. In this case, any needed information has to be found by performing linear searches on the tape recording medium, as represented at step 103.

The preferred embodiment of the present invention, as described above in detail, provides a number of significant advantages. First, the critical data, such as end-of-data information, maintained in a single cartridge memory module can be duplicated in the secondary module. Also, Tape Directory information can be partitioned such that in the event of a module failure, the data on the remaining module are sufficient to locate the tape data with the same level of resolution as is possible today with a single cartridge memory module. This resolves the problem of a single point-of-failure. Importantly, this redundancy cannot be achieved by simply using a larger cartridge memory module. Using a larger cartridge memory module does provide more memory storage space, but is still subject to a single point of failure. Second, the Tape Directory resolution may be increased, providing more landmark information. This information can be used to locate logical records faster than what can be done with the prior art.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of providing redundancy of cartridge memory information within a tape cartridge, comprising the steps:
    providing at least two cartridge memory modules in the tape cartridge; and
    storing an identical set of critical information in each of the two cartridge memory modules;
    wherein each of the two cartridge memory modules includes enough critical information to recover from a failure of either cartridge memory module;
    performing a test to confirm that the time cartridge has two cartridge memory modules; and
    after said test, reading data from both of said two cartridge memory modules, and combining the data read from both of said two cartridges.

2. A method according to claim 1, wherein the tape cartridge includes a recording tape, and the critical information includes a Tape Directory identifying landmarks on the recording tape of said tape cartridge.

3. A method according to claim 2, wherein the critical information further includes end-of-data information.

4. A method according to claim 1, wherein the cartridge memory modules are addressed and modified by a contactless interface.

5. A method according to claim 1, wherein said two cartridge memory modules are physically installed within the same tape cartridge.

6. A method according to claim 5, for use with a tape drive for moving the tape cartridge, and further comprising the step of incorporating a transmitter into the tape drive to read and update information in the cartridge memory modules.

7. A method according to claim 6, wherein the tape drive includes a processor having a routine to determine whether more than one cartridge memory module is present within the tape cartridge.

8. A method according to claim 7, wherein each cartridge memory module has a unique serial number, and the routine determines the serial number of each cartridge memory module within the tape cartridge.

9. A method according to claim 1, further comprising the step of:
    testing the data read from each of the cartridge memory modules to determine if the read data are valid.

10. A method according to claim 9, wherein the combining step includes the step of, if the data from both of the cartridge memory modules are valid, then combining the data read from both of the cartridge memory modules to form aggregate tape directory information.

11. A combination tape cartridge having memory redundancy and tape drive, said combination comprising:
    at least first and second cartridge memory modules, each of the first and second cartridge memory modules storing an identical set of critical information, wherein each of the first and second cartridge memory modules includes enough critical information to recover from a failure of either of the cartridge memory modules; and
    a tape drive including means for performing a test to confirm that the tape cartridge has said first and second cartridge memory modules; and means for operating after said test to read data from both of said first and second cartridge memory modules, and to combine the data read from both of said first and second cartridge memory modules.

12. A combination according to claim 11, further comprising a contactless interface to address and modify the cartridge memory modules.

13. A combination according to claim 11, further comprising a housing, and wherein the first and second memory modules are installed within said housing.

14. A combination according to claim 13, wherein said first and second cartridge memory modules are stacked one on top of another inside said housing.

15. A combination according to claim 11, further comprising a recording tape, and wherein the critical information includes a Tape Directory identifying landmarks on said recording tape.

16. Apparatus to provide redundancy of cartridge memory information within a tape cartridge, comprising:
   at least first and second cartridge memory modules in the tape cartridge, each of the cartridge memory modules storing an identical set of critical information, wherein each of the two cartridge memory modules includes enough critical information to recover from a failure of either cartridge memory module; and
   a tape drive including means for performing a test to confirm that the tape cartridge has said first and second cartridge memory modules; and means for operating after said test to read data from both of said first and second cartridge memory modules, and to combine the data read from both of said first and second cartridge memory modules.

17. Apparatus according to claim 16 further comprising a contactless interface to address and modify the cartridge memory modules.

18. Apparatus according to claim 16, wherein the cartridge memory modules are physically installed within said tape cartridge.

19. Apparatus according to claim 18, wherein the means for operating after said test to read data includes:
   a transmitter incorporated into the tape drive to read and update information in the cartridge memory modules.

20. Apparatus according to claim 18, wherein the means for performing a test includes a processor having a routine to determine whether more than one cartridge memory module is present within the tape cartridge.

21. Apparatus according to claim 16, wherein the tape cartridge includes a recording tape, and the critical information includes a Tape Directory identifying landmarks on said recording tape.

22. Apparatus according to claim 17, wherein the critical information further includes end-of data information.

23. Apparatus according to claim 19, wherein the tape drive includes means for testing the data read from each of the cartridge memory modules to determine if the read data are valid.

24. Apparatus according to claim 13, wherein the the means for operating after said test includes means for combining the data read from both of the cartridge memory modules, if the data read from both of the cartridge memory modules are valid, to form aggregate Tape Directory information.

* * * * *